United States Patent
Song et al.

(10) Patent No.: US 11,330,383 B2
(45) Date of Patent: May 10, 2022

(54) METHOD AND APPARATUS FOR DETECTING ECHO DELAY AND ELECTRONIC DEVICE

(71) Applicant: Beijing Baidu Netcom Science and Technology Co., Ltd., Beijing (CN)

(72) Inventors: Zhengbin Song, Beijing (CN); Danqing Yang, Beijing (CN); Junfei Bu, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/036,845

(22) Filed: Sep. 29, 2020

(65) Prior Publication Data

US 2021/0345053 A1    Nov. 4, 2021

(30) Foreign Application Priority Data

Apr. 30, 2020    (CN) .......................... 202010362972.0

(51) Int. Cl.
*H04R 29/00*    (2006.01)
*G06F 3/16*    (2006.01)

(52) U.S. Cl.
CPC ........... *H04R 29/001* (2013.01); *G06F 3/165* (2013.01)

(58) Field of Classification Search
CPC .............................. H04R 29/001; G06F 3/165
(Continued)

(56) References Cited

U.S. PATENT DOCUMENTS 6,404,886 B1    6/2002    Yoshida et al.
7,555,116 B1    6/2009    Le Tourneur et al.
(Continued)

FOREIGN PATENT DOCUMENTS

CN    103700374 A    4/2014
CN    106210371 A    12/2016
(Continued)

OTHER PUBLICATIONS

Extended European Search Report for corresponding to EPO Patent Application No. 20201802.4-1205, dated Mar. 10, 2021 (7 pages).
(Continued)

*Primary Examiner* — Ammar T Hamid
(74) *Attorney, Agent, or Firm* — Maginot, Moore & Beck LLP

(57) ABSTRACT

A method and an apparatus detect an echo delay. If an electronic device plays an audio and a counter is in an on state, an $N^{th}$ recording data block received after the counter is turned on is acquired, where the $N^{th}$ recording data block is a currently received recording data block, and N is greater than 1. Matching is performed between the $N^{th}$ recording data block and a reference data block that is in a buffer, where the recording data block and the reference data block are data blocks with target duration. After the counter is on, the buffer buffers an audio data block played by the electronic device. If the $N^{th}$ recording data block matches the reference data block in the buffer, a counting value is acquired. The counter performs counting if the recording data block does not match the reference data block. An echo delay is determined based on the target duration and the counting value.

20 Claims, 3 Drawing Sheets

(58) Field of Classification Search
USPC .............................................. 381/59, 66, 58
See application file for complete search history.

(56) References Cited

U.S. PATENT DOCUMENTS

| 9,812,146 | B1* | 11/2017 | Gejji .................... G10L 21/0208 |
| 9,916,840 | B1* | 3/2018 | Do ......................... H04M 9/082 |
| 2004/0081315 | A1 | 4/2004 | Boland et al. |
| 2012/0201370 | A1 | 8/2012 | Mazurenko et al. |
| 2015/0172468 | A1 | 6/2015 | Liu et al. |
| 2015/0371654 | A1* | 12/2015 | Johnston ............. G10L 21/0232 |
| | | | 381/66 |

FOREIGN PATENT DOCUMENTS

| CN | 106231145 A | 12/2016 |
| CN | 106470284 A | 3/2017 |
| CN | 107333018 A | 11/2017 |
| CN | 109040501 A | 12/2018 |
| CN | 109493883 A | 3/2019 |
| CN | 109688284 A | 4/2019 |
| JP | 2001144655 A | 5/2001 |
| JP | 2003517782 A | 5/2003 |
| JP | 2004282700 A | 10/2004 |
| JP | 2014060597 A | 4/2014 |

OTHER PUBLICATIONS

Machine Translation of Japanese Patent Application No. 2020-191504, dated Oct. 11, 2021 (3 pages).
Japanese Office Action corresponding to Japanese Patent Application No. 2020-191504, dated Oct. 11, 2021 (3 pages).
Chinese Office Action corresponding to Chinese Patent Application No. 202010362972.0, dated Mar. 14, 2022 (6 pages).
Translation of Chinese Office Action corresponding to Chinese Patent Application No. 202010362972.0, dated Mar. 14, 2022 (1 page).
Lei, Wentai, et al. "A time-delay estimation algorithm of GPR recording profile based on sliding window." 2018 2nd IEEE Advanced Information Management, Communicates, Electronic and Automation Control Conference (IMCEC). IEEE, 2018.
Fu, Zhengjun, et al. "Echo Cancellation Implementation with Long Time Delay" 2007. 1008-0570(207)03-1-0298-03.

\* cited by examiner

METHOD AND APPARATUS FOR DETECTING ECHO DELAY AND ELECTRONIC DEVICE

CROSS-REFERENCE TO RELATED APPLICATION

This application claims priority under 35 U.S.C. § 119 to Chinese Patent Application No. 202010362972.0 filed in China on Apr. 30, 2020, the disclosure of which is incorporated herein in its entirety by reference.

TECHNICAL FIELD

This application relates to audio processing technologies in the field of computer technologies, and in particular, to a method and an apparatus for detecting an echo delay and an electronic device.

BACKGROUND

Time delay detection is applied to echo cancellation applications. With an echo delay known, an echo cancellation algorithm may be used to cancel an echo. In the echo cancellation algorithm, a time difference between played audio data and recording data is usually calculated only through a large quantity of calculations, and the time difference acquired through calculation is determined as the echo delay.

SUMMARY

According to a first aspect, a method for detecting an echo delay is provided, applied to a first electronic device provided with a counter, and including: in a case that the first electronic device plays an audio and the counter is turned on, acquiring an $N^{th}$ recording data block received after the counter is in an on state, where the $N^{th}$ recording data block is a currently received recording data block, and N is an integer greater than 1; performing matching between the $N^{th}$ recording data block and a reference data block that is in a buffer, where both the recording data block and the reference data block are data blocks with target duration, and the buffer is configured to: after the counter is turned on, buffer an audio data block played by the first electronic device; in a case that the $N^{th}$ recording data block matches the reference data block in the buffer, acquiring a first counting value of the counter, where the counter performs counting in a case that the recording data block does not match the reference data block in the buffer; and determining the echo delay based on the target duration and the first counting value.

According to a second aspect, an apparatus for detecting an echo delay is further provided, applied to a first electronic device provided with a counter, and including: a recording data block acquiring module, configured to: in a case that the first electronic device plays an audio and the counter is in an on state, acquire an $N^{th}$ recording data block received after the counter is turned on, where the $N^{th}$ recording data block is a currently received recording data block, and N is an integer greater than 1; a matching module, configured to perform matching between the $N^{th}$ recording data block and a reference data block that is in a buffer, where both the recording data block and the reference data block are data blocks with target duration, and the buffer is configured to: after the counter is turned on, buffer an audio data block played by the first electronic device; a first counting value acquiring module, configured to: in a case that the $N^{th}$ recording data block matches the reference data block in the buffer, acquire a first counting value of the counter, where the counter performs counting in a case that the recording data block does not match the reference data block in the buffer; and an echo delay determining module, configured to determine the echo delay based on the target duration and the first counting value.

According to a third aspect, an electronic device further provided, including: at least one processor; and a memory in a communication connection with the at least one processor, where the memory stores an instruction executable by the at least one processor, and the instruction, in a case that executed by the at least one processor, causes the at least one processor can execute to perform the method in the first aspect.

According to a fourth aspect of the present disclosure, a non-transitory computer-readable storage medium storing a computer instruction is provided, where the computer instruction is used for causing a computer to perform the method in the first aspect.

It should be appreciated that the content described in this section is not intended to identify key or important features of the embodiments of the present disclosure, nor is it intended to limit the scope of the present disclosure. Other features of the present disclosure are easily understood based on the following description.

BRIEF DESCRIPTION OF THE DRAWINGS

The accompanying drawings are used for better understanding of solutions, but shall not be construed as limiting the present disclosure. In these drawings.

DETAILED DESCRIPTION

The following describes exemplary embodiments of the present disclosure with reference to accompanying drawings. Various details of the embodiments of the present disclosure are included to facilitate understanding, and should be considered as being merely exemplary. Therefore, those of ordinary skill in the art should be aware that various changes and modifications may be made to the embodiments described herein without departing from the scope and spirit of the present disclosure. Likewise, for clarity and conciseness, descriptions of well-known functions and structures are omitted below.

A method and an apparatus for detecting an echo delay and an electronic device are provided, to resolve the problem of large consumption of computing resources in the current process of detecting the echo delay.

Figure 1:
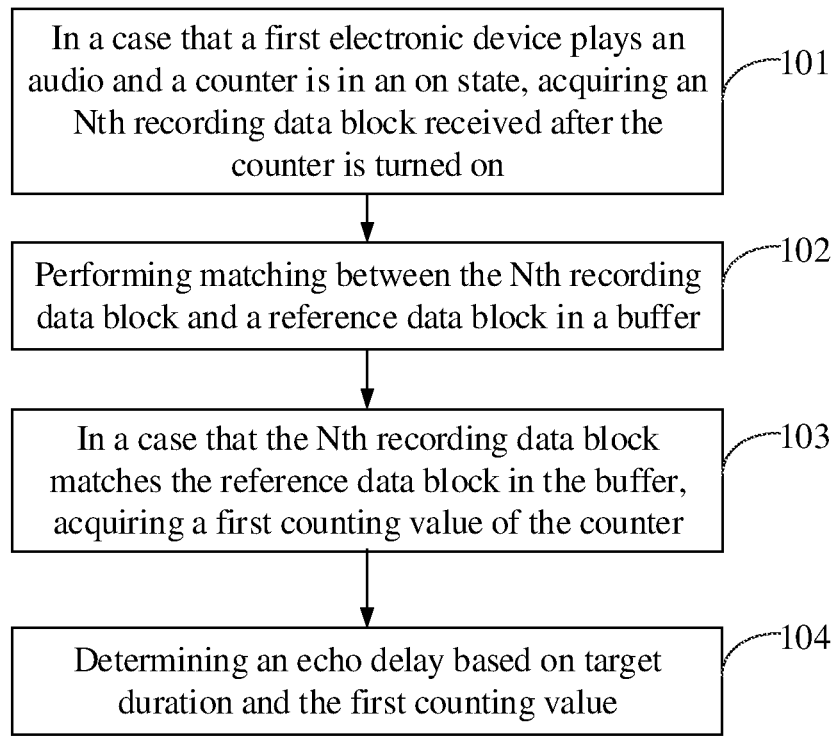
FIG. 1 is a schematic diagram of an embodiment according to the present disclosure.

Referring to FIG. 1, an embodiment of the present disclosure provides a method for detecting an echo delay. The method may be applied to a first electronic device. As shown in FIG. 1, the method for detecting the echo delay includes the following steps.

Step 101 comprises, in a case that the first electronic device plays an audio and a counter is in an on state, acquiring an $N^{th}$ recording data block received after the counter is turned on, where the $N^{th}$ recording data block is a currently received recording data block, and N is an integer greater than 1.

Step 102 comprises performing matching between the $N^{th}$ recording data block and a reference data block that is in a buffer, where both the recording data block and the reference data block are data blocks with target duration, and the buffer is configured to, after the counter is turned on, buffer an audio data block played by the first electronic device.

Step 103 comprises, in a case that the $N^{th}$ recording data block matches the reference data block in the buffer, acquiring a first counting value of the counter, where the counter performs counting in a case that the recording data block does not match the reference data block in the buffer.

Step 104 comprises determining the echo delay based on the target duration and the first counting value.

Herein, the first electronic device may acquire the first counting value of the counter based on a result of performing matching between the currently received recording data block and the audio data block buffered in the buffer, and determine the echo delay based on the first counting value of the counter and the target duration of the data block. Compared with determining an echo delay by calculating a time difference between recording data and played audio data, a quantity of consumed computing resources may be reduced, especially in a case that a long delay is detected, so that efficiency of detecting the echo delay may be increased.

It should be appreciated that, in a process in which the first electronic device plays the audio, after the counter is turned on, the first electronic device starts to buffer the played audio data block as the reference data block, and acquires the currently received recording data block. Both the recording data block and the reference data block are the data blocks for the target duration, and the target duration may be duration specified according to practical conditions. For example, the target duration is preset to be 8 ms. In a case that a sampling rate of the first electronic device is 16 KHz, a size of each of the recording data block and the reference data block includes 128 sampling points.

Specifically, in an example in which the first electronic device turns on the counter at 12:00:08, a first recording data block received by the first electronic device includes recording data recorded from 12:00:00 to 12:00:07, a second recording data block includes recording data recorded from 12:00:08 to 12:00:15, and a third recording data block includes recording data recorded from 12:00:16 to 12:00:23, and so on. A first reference data block buffered in the buffer includes audio data played from 12:00:00 to 12:00:07, a second reference data block includes audio data played from 12:00:08 to 12:00:15, a third reference data block includes audio data played from 12:00:16 to 12:00:23, and so on.

In addition, the counter may be turned on in a case that a target operation of a user is received in the process in which the first electronic device plays the audio. Or the first electronic device automatically triggers to turns on the counter. For example, the counter may be turned on in a case that duration for playing the audio reaches certain duration, such as 30 s.

In some implementations, prior to step 101, the method may further include turning on the counter in a case that it is detected that the played audio data block is valid. In this way, the counter may be turned on conveniently and in time.

In this implementation, the first electronic device may detect whether the played audio data block is valid. Specifically, the first electronic device may detect whether there is a sound signal in the audio data block. In a case that there is the sound signal, the first electronic device determines that the audio data block is valid; otherwise, the first electronic device determines that the audio data block is invalid.

In addition, in a case that the counter is turned on, the first electronic device may buffer the valid audio data block in the buffer as the first reference data block in the buffer.

It should be appreciated that, in a case that the first electronic device detects that a currently played audio data block is invalid, the counter may be turned off, and is turned on again in a case that a valid audio data block is detected next time. In addition, the first electronic device clears the buffer in a case that the counter is turned off.

In the present disclosure, in a case that the first electronic device plays the audio, an audio player of the first electronic device may play the audio and a sound output apparatus (such as a speaker) of the first electronic device outputs the audio, and the recording data is recorded and acquired by using a recording apparatus (such as a microphone) of the first electronic device while the sound output apparatus outputs a sound of the audio.

Alternatively, in some implementations, the first electronic device is configured to transmit the played audio to a second electronic device, and the second electronic device is configured to output the audio; and the $N^{th}$ recording data block is a recording data block recorded in a case that the second electronic device outputs the audio.

Herein, the first electronic device transmits the played audio to a sound output apparatus of the second electronic device for outputting, and records, by using the recording apparatus of the first electronic device, the sound of the audio that is output by the sound output apparatus of the second electronic device. Since there is a relatively long delay due to data transmission, there is a relatively long echo delay between audio data and recording data that are at a same time. In this case, by using the method for determining the echo delay in the present disclosure, an operation quantity of detecting the echo delay may be significantly reduced, and efficiency of detecting a long echo delay is effectively increased.

For example, in a case that the first electronic device is a smart rear-view mirror in a vehicle and the second electronic device is a vehicle-mounted terminal of the vehicle, in a process in which the smart rear-view mirror performs navigation, the smart rear-view mirror may transmit a navigation voice (that is, the reference data block includes audio data of the navigation voice) to the vehicle-mounted terminal by using a data transmission protocol (such as the Carlife protocol), and an in-vehicle speaker of the vehicle-mounted terminal outputs the navigation voice. The smart rear-view mirror performs driving monitoring, and records, by using a microphone array of the smart rear-view mirror, the navigation voice that is output by the in-vehicle speaker (that is, the recording data block includes audio data of the recorded navigation voice).

Alternatively, the first electronic device may be configured to play and output the audio, the recording data block may be a recording data block recorded by the second electronic device in a case that the first electronic device outputs the audio, and the second electronic device transmits the recording data block to the first electronic device.

It should be appreciated that, the counter may be a virtual module or a physical module in the first electronic device, and a counting value of the counter is added by 1 in a case that the currently received recording data block does not match the reference data block buffered in the buffer. Counting is not performed in a case that the currently received recording data block matches the reference data block buffered in the buffer.

In step 101, in a case that the first electronic device plays the audio and the counter is in an on state, the first electronic device may acquire the currently received recording data block, i.e., the $N^{th}$ recording data block.

In the present disclosure, in an actual operation process of the first electronic device, a certain delay usually exists between audio data played by the first electronic device and the recording data recorded by the first electronic device at a same time, such as tens of milliseconds or even hundreds of milliseconds. Therefore, the first recording data block received after the counter is turned on usually does not match the reference data block in the buffer, that is, for the first recording data block, the first electronic device does not perform the entire process from step 101 to step 104. The second recording data block or a subsequent recording data block may match the reference data block in the buffer. Therefore, N is an integer greater than 1.

Certainly, to ensure that the counter normally performs the counting, in a case that receiving the first recording data block, the first electronic device may perform matching between the first recording data block and the reference data block buffered in the buffer (at this time, there is only the first reference data block buffered in the buffer). In a case that a matching result is that the first recording data block does not match the reference data block buffered in the buffer, the counting value of the counter is added by 1. That is, step 101 to step 103 are performed in a case that the first electronic device acquires the first recording data block.

In step 102, in a case that the first electronic device acquires the currently received recording data block, i.e., the $N^{th}$ recording data block, the first electronic device performs matching between the $N^{th}$ recording data block and the reference data block buffered in the buffer.

In the present disclosure, matching may be performed between the $N^{th}$ recording data block and the reference data block buffered in the buffer in the following manner: a similarity between the $N^{th}$ recording data block and the reference data block in the buffer may be calculated by using a preset similarity calculation method. In a case that there is an audio data block in the buffer and whose similarity to the $N^{th}$ recording data block is greater than or equal to a preset threshold, the first electronic device determines that the $N^{th}$ recording data block matches the reference data block in the buffer. Otherwise, the first electronic device determines that the $N^{th}$ recording data block does not match the reference data block in the buffer.

For example, the first electronic device may calculate a ratio of similar sampling points in the $N^{th}$ recording data block and the buffered reference data block as the similarity. Under a condition that the preset threshold is 60%, in a case that a similarity between the $N^{th}$ recording data block and a reference data block buffered in the buffer is greater than or equal to 60% (for example, the similarity is 70%), it is determined that the $N^{th}$ recording data block matches the reference data block in the buffer. In a case that the similarity between the $N^{th}$ recording data block and each reference data block buffered in the buffer is less than 60%, it is determined that the $N^{th}$ recording data block does not match the reference data block in the buffer.

In addition, in a case that matching is performed between the $N^{th}$ recording data block and the reference data block in the buffer, matching may be performed between the $N^{th}$ recording data block and each reference data block in the buffer. For example, in the example in which the first electronic device turns on the counter at 12:00:08, in a case that the first electronic device receives the third recording data block (that is, the third recording data block includes recording data recorded from 12:00:16 to 12:00:23). At this time, the first reference data block, the second reference data block, and the third reference data block are buffered in the buffer. The first electronic device calculates a similarity between the third recording data block and each of the first reference data block, the second reference data block, and the third reference data block respectively, to determine whether there is a reference data block in the buffer and whose similarity to the third recording data block is greater than or equal to the preset threshold.

Alternatively, in some implementations, step 102 includes: in a case that an $(N-1)^{th}$ recording data block does not match the reference data block in the buffer, performing matching between the $N^{th}$ recording data block and a first recording data block in the buffer.

In this implementation, because a delay of tens of milliseconds or even hundreds of milliseconds exists between recording data and played audio data, that is, the first reference data block buffered after the counter is turned on usually matches the recording data block (for example, the second recording data block or a recording data block after the second recording data block) received after audio data of the first reference data block is played.

Therefore, in a case that a previous recording data block does not match the reference data block of the buffer, the first electronic device performs matching between the currently received recording data block and the first recording data block, so that the operation quantity may be effectively reduced and processing efficiency of detecting the echo delay is further increased while matching accuracy is ensured.

For example, in the example in which the first electronic device turns on the counter at 12:00:08, after receiving the second recording data block, in a case that the first recording data block does not match the first reference data block in the buffer, the first electronic device performs matching between the second recording data block and the first recording data block. After receiving the third recording data block, in a case that the second recording data block does not match each of the first reference data block and the second reference data block that are in the buffer, the first electronic device performs matching between the third recording data block and the first recording data block. After receiving a fourth recording data block, in a case that the third recording data block does not match each of the first reference data block, the second reference data block and the third reference data block that are in the buffer, the first electronic device performs matching between the fourth recording data block and the first recording data block, and so on.

It should be appreciated that, in a case that the currently received recording data block matches the first reference data block, a subsequently received recording data block may also match a reference data block buffered after the first reference data block. Therefore, specifically, step 102 may further include: in a case that an $(N-1)^{th}$ recording data block matches a $k^{th}$ reference data block in the buffer, performing matching between the $N^{th}$ recording data block and a $(k+1)^{th}$ reference data block in the buffer, where k is a positive integer.

In addition, that the $(N-1)^{th}$ recording data block does not match the reference data block in the buffer may be that the $(N-1)^{th}$ recording data block does not match the first reference data block or the $k^{th}$ reference data block.

For example, in the example in which the first electronic device turns on the counter at 12:00:08, after receiving the third recording data block, in a case that the second recording data block matches the first reference data block in the buffer, the first electronic device performs matching between the third recording data block and the second recording data block; otherwise, the first electronic device performs matching between the third recording data block and the first recording data block. After receiving the fourth recording data block, in a case that the third recording data block matches the second reference data block in the buffer, the first electronic device performs matching between the fourth recording data block and the third recording data block; otherwise, the first electronic device performs matching between the fourth recording data block with the first recording data block, and so on.

In step 103, in a case that the first electronic device determines that the $N^{th}$ recording data block matches the reference data block in the buffer, the first electronic device may acquire a first counting value of the counter.

In the present disclosure, that the first electronic device may acquire the first counting value of the counter may be that the first electronic device may determine a current counting value of the counter as the first counting value in a case that determining the currently received recording data block matches the reference data block in the buffer, and stop performing matching for a subsequent recording data block.

Alternatively, in some implementations, the acquiring a first counting value of the counter includes: acquiring a target quantity of matching times, where the target quantity of matching times is a quantity of times that the first electronic device continuously determines that the currently received recording data block matches the reference data block in the buffer; and acquiring the first counting value of the counter in a case that the target quantity of matching times meets a preset condition.

Herein, in a case that the first electronic device determines that the currently received recording data block matches the reference data block in the buffer, the first electronic device may acquire the target quantity of matching times, and acquire the first counting value based on the target quantity of matching times, so that a condition of acquiring the counting value of the counter is stricter, thereby improving accuracy of detecting the echo delay.

The target quantity of matching times is the quantity of times that the first electronic device continuously determines that the currently received recording data block matches the reference data block in the buffer. For example, in the example in which the first electronic device turns on the counter at 12:00:08, under a condition that the first electronic device determines that the second recording data block matches the first reference data block, in a case that the first electronic device receives the third recording data block, matching is performed between the third recording data block and the second reference data block, and in a case that in a case that the first electronic device determines that the third recording data block matches the second reference data block, the target quantity of matching times is two. Further, in a case that the first electronic device receives the fourth recording data block, matching is performed between the fourth recording data block and the third reference data block, and in a case that the first electronic device determines that the fourth recording data block matches the third reference data block, the target quantity of matching times is three, and so on.

In addition, the preset condition may be a determining condition that is preset according to a practical need. In some implementations, the acquiring the first counting value of the counter in a case that the target quantity of matching times meets a preset condition includes: in a case that the target quantity of matching times is greater than or equal to a preset quantity of times, acquiring the first counting value of the counter, where a value of the preset quantity of times is an integer greater than 1.

Herein, in a case that the target quantity of matching times is greater than or equal to the preset quantity of times, that is, the quantity of times that the first electronic device continuously determines that the currently received recording data block matches the reference data block in the buffer is greater than or equal to the preset quantity of times, the first electronic device acquires the counting value of the counter, thereby improving the accuracy of detecting the echo delay.

For example, under a condition that the preset quantity of times is three, in a case that the first electronic device determines that the fourth recording data block matches the third reference data block, that is, the target quantity of matching times is three, the first electronic device acquires the counting value of the counter. In this case, only the first recording data block does not match the reference data block in the buffer. Therefore, the counting value of the counter is 1.

Alternatively, in some other implementations, a maximum storage capacity of the buffer is equal to sizes of M reference data blocks, and M is an integer greater than 1.

In addition, the acquiring the first counting value of the counter in a case that the target quantity of matching times meets a preset condition includes, in a case that the target quantity of matching times is M, acquiring the first counting value of the counter.

Herein, the first electronic device acquires the counting value of the counter only in a case that the target quantity of matching times is a maximum quantity of recording data blocks stored in the buffer, so that the condition of acquiring the counting value of the counter is stricter, thereby further improving the accuracy of detecting the echo delay.

For example, under a condition that the maximum storage capacity of the buffer is equal to sizes of 16 reference data blocks, in a case that the first electronic device determines, for 16 consecutive times, that the currently received recording data block matches the reference data block buffered in the buffer, the counting value of the counter is acquired.

In addition, in one of the foregoing cases, in a case that the $(N-1)^{th}$ recording data block does not match the reference data block in the buffer, matching is performed between the $N^{th}$ recording data block and the first recording data block in the buffer; in a case that the $(N-1)^{th}$ recording data block matches the $k^{th}$ reference data block in the buffer, matching is performed between the $N^{th}$ recording data block and the $(k+1)^{th}$ reference data block in the buffer, and the first electronic device acquires the counting value of the counter only in a case that each reference data block buffered in the buffer matches a recording data block.

For example, assuming that the buffer may buffer a maximum of 16 reference data blocks, under a condition that the first electronic device determines that each of first three recording data blocks does not match the reference data block buffered in the buffer, that is, the counting value is 3, in a case that the first electronic device determines that the fourth recording data block matches the first reference data block, a fifth recording data block matches a second reference data block, ..., an $(i+3)^{th}$ recording data block matches an $i^{th}$ reference data block, . . . , and a $19^{th}$ recording data block matches a $16^{th}$ reference data block, where i is an integer greater than 2 and less than 16, the first electronic device acquires the counting value of the counter, that is, the counting value is 3.

It should be appreciated that, in a case that the maximum storage capacity of the buffer is equal to sizes of M reference data blocks, after the M reference data blocks are buffered in the buffer after the counter is turned on, a subsequently played audio data block is no longer buffered to the buffer. In addition, subsequently, in a case that a recording data block is currently received, the first electronic device performs matching between the currently received recording data block and the M reference data blocks.

In addition, the first electronic device may control, based on a preset condition, the counter to be restarted and the buffer to be cleared. Specifically, after the performing matching between the $N^{th}$ recording data block and the reference data block that is in a buffer, the method further includes: in a case that the $N^{th}$ recording data block does not match the reference data block in the buffer, acquiring a second counting value of the counter; and in a case that a delay determined based on the second counting value and the target duration is greater than or equal to a preset delay threshold, clearing the buffer and resetting the counter.

Herein, the first electronic device may clear the buffer and reset the counter in time in a case that a delay corresponding to the counting value of the counter exceeds the preset delay threshold, so as to avoid restarting an echo delay detection process in a case that the first counting value of the counter cannot be acquired for a long time, thereby further increasing efficiency of detecting the echo delay.

For example, the preset delay threshold may be set to be 2 s, and in a case that the delay corresponding to the current counting value (i.e., the second counting value) of the counter is greater than 2 s, the first electronic device clears the buffer and resets the counter.

In step 104, after the first electronic device acquires the first counting value, the first electronic device may determine the echo delay based on the first counting value and the target duration.

In the present disclosure, determining the echo delay based on the first counting value and the target duration may be determining a product of the first counting value and the target duration as the echo delay. For example, in a case that the target delay is 8 ms and the first counting value is 10, the echo delay is 80 ms.

To facilitate understanding of the method for detecting the echo delay in the present disclosure, a process of the method for detecting the echo delay in practical application is explained as follows.

Assuming that duration (that is, the target duration) of each data block is 8 ms, and the maximum storage capacity of the buffer is equal to sizes of 16 blocks of reference data (that is, M=16), under a condition that the first recording data block (at this time, the first reference data block is buffered in the buffer) is received, the first electronic device performs matching between the first recording data block and the buffered first reference data block. In a case that the first recording data block does not match the buffered first reference data block, the counter is added by 1. The first electronic device continues to perform matching between a currently received second recording data block and the first reference data block. In a case that the currently received second recording data block does not match the first reference data block, the counter is added by 1 again. The first electronic device continues to perform matching between a currently received third recording data block and the first reference data block. In a case that the third recording data block matches the first reference data block, the first electronic device continues to perform matching between a currently received fourth recording data block and the second reference data block, . . . until that an $18^{th}$ recording data block matches a $16^{th}$ reference data block. In this way, it is acquired that the counting value of the counter is 2 (i.e., the first counting value), and it is determined that the echo delay is 16 ms.

In a case that each of the third recording data block to the $18^{th}$ recording data block does not match a currently corresponding reference data block. For example, the fourth recording data block matches the second reference data block, and the fifth block does not match the third reference data block. Or, the currently received recording data block does not match the first reference data block in a case that matching is performed between the currently received recording data block and the first reference data block. For example, the third recording data block does not match the first reference data block, the first electronic device performs matching between a next received recording data block and the first reference data block.

In addition, in a case that the preset delay threshold is 2 ms, under a condition that the counting value of the counter is 16, that is, the delay corresponding to the counting value of the counter is greater than the preset delay threshold, the first electronic device restarts the counter and clears the buffer.

Figure 2:
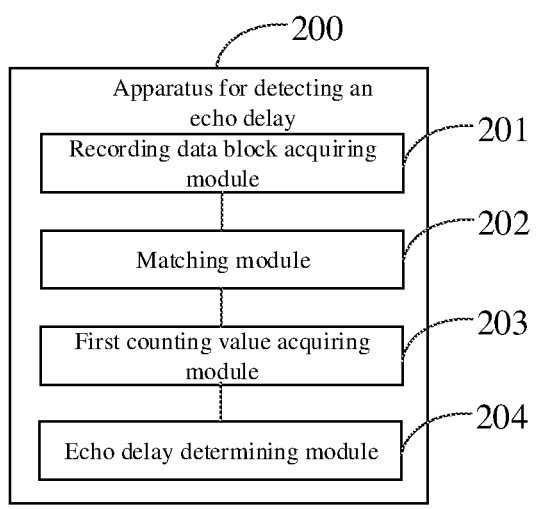
FIG. 2 is a schematic diagram of an embodiment according to the present disclosure.

Referring to FIG. 2, an embodiment of the present disclosure provides an apparatus for detecting an echo delay, applied to a first electronic device provided with a counter. As shown in FIG. 2, the apparatus 200 for detecting the echo delay includes a recording data block acquiring module 201, which is configured to, in a case that the first electronic device plays an audio and the counter is in an on state, acquire an $N^{th}$ recording data block received after the counter is turned on, where the $N^{th}$ recording data block is a currently received recording data block, and N is an integer greater than 1. The apparatus 200 also includes a matching module 202, configured to perform matching between the $N^{th}$ recording data block and a reference data block that is in a buffer, where both the recording data block and the reference data block are data blocks with target duration. The buffer is configured to, after the counter is turned on, buffer an audio data block played by the first electronic device. The apparatus 200 further includes a first counting value acquiring module 203, configured to, in a case that the $N^{th}$ recording data block matches the reference data block in the buffer, acquire a first counting value of the counter, where the counter performs counting in a case that the recording data block does not match the reference data block in the buffer. The apparatus 200 also includes an echo delay determining module 204 configured to determine the echo delay based on the target duration and the first counting value.

Figure 3:
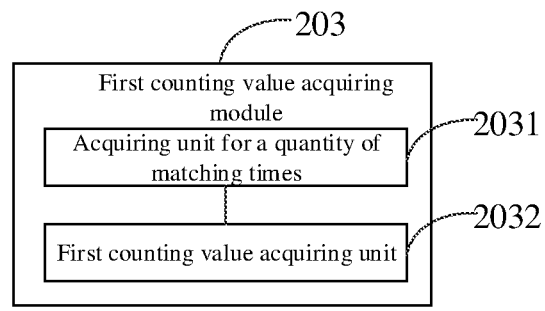
FIG. 3 is a schematic diagram of an embodiment according to the present disclosure.

Optionally, as shown in FIG. 3, the first counting value acquiring module 203 includes: an acquiring unit 2031 for a quantity of matching times, configured to acquire a target quantity of matching times, where the target quantity of matching times is: a quantity of times that the first electronic device continuously determines that the currently received recording data block matches the reference data block in the buffer; and a first counting value acquiring unit 2032, configured to acquire the first counting value of the counter in a case that the target quantity of matching times meets a preset condition.

Optionally, the first counting value acquiring unit 2032 is configured to, in a case that the target quantity of matching times is greater than or equal to a preset quantity of times, acquire the first counting value of the counter, where a value of the preset quantity of times is an integer greater than 1.

Optionally, a maximum storage capacity of the buffer is equal to sizes of M reference data blocks, and M is an integer greater than 1. In such a case, the first counting value acquiring unit 2032 is configured to, in a case that the target quantity of matching times is M, acquire the first counting value of the counter.

Optionally, the matching module 202 of FIG. 2 is configured to, in a case that an $(N-1)^{th}$ recording data block does not match the reference data block in the buffer, perform matching between the $N^{th}$ recording data block and a first recording data block in the buffer.

Figure 4:
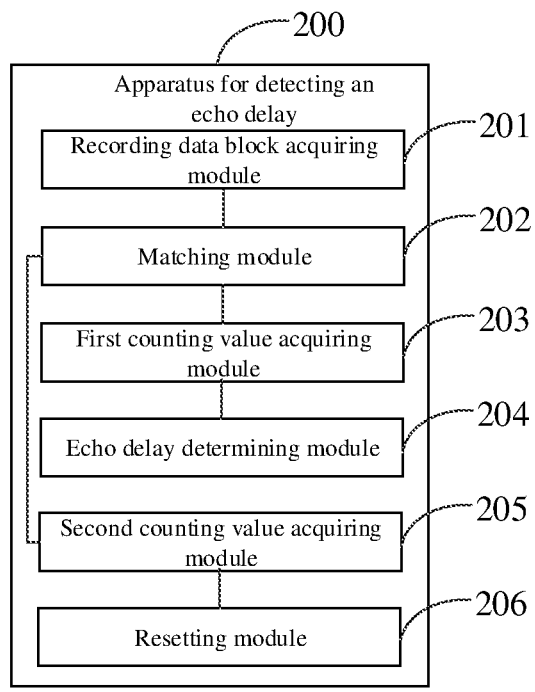
FIG. 4 is a schematic diagram of an embodiment according to the present disclosure.

Optionally, as shown in FIG. 4, the apparatus 200 further includes a second counting value acquiring module 205 and a resetting module 206. The second counting value acquiring module 205 is configured to, in a case that the $N^{th}$ recording data block does not match the reference data block in the buffer, acquire a second counting value of the counter. The resetting module 206 is configured to, in a case that a delay determined based on the second counting value and the target duration is greater than or equal to a preset delay threshold, clear the buffer and reset the counter.

Optionally, the first electronic device is configured to transmit the played audio to a second electronic device, and the second electronic device is configured to output the audio; and the $N^{th}$ recording data block is a recording data block recorded in a case that the second electronic device outputs the audio.

It should be appreciated that, the apparatus 200 may implement each process implemented by the electronic device in the method embodiment in FIG. 1 in the present disclosure, and achieve same beneficial effects. To avoid repetition, details are not described herein again.

Based on an embodiment of the present disclosure, the present disclosure further provides an electronic device and a readable storage medium.

Figure 5:
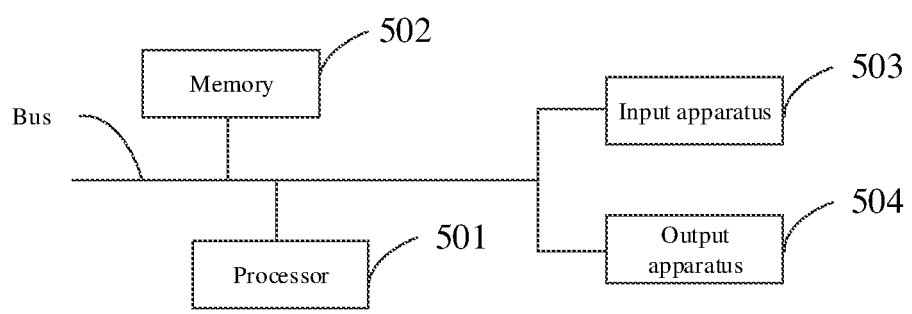
FIG. 5 is a block diagram of an electronic device configured to implement a method for detecting an echo delay according to an embodiment of the present disclosure.

FIG. 5 is a block diagram of an electronic device for implementing a method for detecting an echo delay according to an embodiment of the present disclosure. Electronic devices are intended to represent digital computers in various forms, such as a laptop computer, a desktop computer, a workstation, a personal digital assistant, a server, a blade server, a mainframe computer, and another suitable computer. Electronic devices may further represent mobile apparatuses in various forms, such as personal digital processing, a cellular phone, a smart phone, a wearable device, and another similar computing apparatus. The components shown herein, connections and relationships thereof, and functions thereof are merely examples, and are not intended to limit the implementations of the present disclosure described and/or required herein.

As shown in FIG. 5, the electronic device includes one or more processors 501, a memory 502, and an interface for connecting various components, including a high-speed interface and a low-speed interface. The components are connected to each other by using different buses, and may be installed on a common motherboard or in other ways as required. The processor may process an instruction executed in the electronic device, including an instruction stored in or on the memory to display graphical information of a GUI on an external input/output apparatus (such as a display device coupled to an interface). In another implementation, if necessary, a plurality of processors and/or a plurality of buses may be used together with a plurality of memories. Similarly, a plurality of electronic devices may be connected, and each device provides some necessary operations (for example, used as a server array, a group of blade servers, or a plurality of processor systems). In FIG. 5, one processor 501 is used as an example.

The memory 502 may suitably be a non-transitory computer-readable storage medium provided in the present disclosure. The memory 502 stores an instruction executable by at least one processor, and causing the at least one processor to perform the method for detecting the echo delay provided in the present disclosure. The non-transitory computer-readable storage medium in the present disclosure stores a computer instruction, and the computer instruction is used for causing a computer to execute the method for detecting the echo delay provided in the present disclosure.

As a non-transitory computer-readable storage medium, the memory 502 may be used to store a non-transitory software program, a non-transitory computer-executable program, and a module, such as a program instruction/module corresponding to the method for detecting the echo delay in the embodiment of the present disclosure (for example, the recording data block acquiring module 201, the matching module 202, the first counting value acquiring module 203, and the echo delay determining module 204 shown in FIG. 2). The processor 501 executes various functional applications and data processing of the server by running the non-transient software program, instruction, and module that are stored in the memory 502, that is, implementing the method for detecting the echo delay in the foregoing method embodiment.

The memory 502 may include a program storage area and a data storage area. The program storage area may store an operating system and an application program required by at least one function. The data storage area may store data created based on use of an electronic device for detecting the echo delay. In addition, the memory 502 may include a high-speed random access memory, and may further include a non-transitory memory, such as at least one magnetic disk storage device, a flash memory device, or another non-transitory solid-state storage device. In some embodiments, the memory 502 may optionally include a memory remotely provided with respect to the processor 501, and these remote memories may be connected, through a network, to the electronic device for detecting the echo delay. Examples of the network include, but are not limited to, the Internet, the Intranet, an LAN, a mobile communication network, and a combination thereof.

The electronic device for detecting the echo delay may further include an input apparatus 503 and an output apparatus 504. The processor 501, the memory 502, the input apparatus 503 and the output apparatus 504 may be connected to each other through a bus or in other ways. In FIG. 5, a bus such for connection is used as an example.

The input apparatus 503 may receive digital or character information that is inputted, and generate key signal input related to a user setting and function control of the electronic device for detecting the echo delay, such as a touch screen, a keypad, a mouse, a trackpad, a touchpad, and a pointing stick, one or more mouse buttons, a trackball, a joystick, or another input apparatus. The output apparatus 504 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

The various implementations of the system and technology described herein may be implemented in a digital electronic circuit system, an integrated circuit system, an application specific integrated circuit (ASIC), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a dedicated or general-purpose programmable processor, may receive data and an instruction from a storage system, at least one input apparatus, and at least one output apparatus, and transmit the data and instruction to the storage system, the at least one input apparatus, and the at least one output apparatus.

The calculation programs (also referred to as programs, software, software applications, or code) include a machine instruction of the programmable processor, and may be implemented by using a high-level procedure and/or an object-oriented programming language, and/or an assembly/machine language. As used herein, the terms "machine-readable medium" and "computer-readable medium" refer to any computer program product, device, and/or apparatus (such as a magnetic disk, an optical disc, a memory, or a programmable logic device (PLD)) configured to provide a machine instruction and/or data to the programmable processor, including a machine-readable medium that receive a machine instruction used as a machine-readable signal. The term "machine-readable signal" refers to any signal used to provide a machine instruction and/or data to the programmable processor.

To provide interaction with a user, the system and technology described herein may be implemented on a computer that is provided with: a display apparatus (such as a cathode ray tube (CRT) or an liquid crystal display (LCD) monitor) configured to display information to the user; and a keyboard and a pointing apparatus (such as a mouse or a trackball) through which the user may provide input to the computer. Other types of apparatuses may be further configured to provide interaction with the user, for example, a feedback provided to the user may be a sensory feedback in any form (for example, a visual feedback, an auditory feedback, or a tactile feedback); and may receive input from the user in any form (including acoustic input, voice input, or tactile input).

The system and technology described herein may be implemented in a computing system that includes a back-end component (for example, used as a data server), or a computing system that includes a middleware component (for example, an application server), or a computing system that includes a front-end component (for example, a user computer with a graphical user interface or a web browser, through which the user may interact with the implementation of the system and technology described herein), or a computer system that includes any combination of the back-end component, the middleware component, and the front-end component. The components of the system may be connected to each other through digital data communication (for example, a communication network) in any form or medium. Examples of the communication network include: a local area network (LAN), a wide area network (WAN), and the Internet.

A computer system may include a client and a server. The client and the server are generally far away from each other and usually interact through the communication network. A client-server relationship is generated by computer programs that run on corresponding computers and that have a client-server relationship.

In the present disclosure, in a case that the first electronic device plays the audio and the counter is in an on state, the $N^{th}$ recording data block received after the counter is turned on is acquired, where the $N^{th}$ recording data block is the currently received recording data block, and N is an integer greater than 1; matching is performed between the $N^{th}$ recording data block and the reference data block in the buffer, where both the recording data block and the reference data block are data blocks with the target duration, and the buffer is configured to: after the counter is turned on, buffer the audio data block played by the first electronic device; in a case that the $N^{th}$ recording data block matches the reference data block in the buffer, the first counting value of the counter is acquired, where the counter performs the counting in a case that the recording data block does not match the reference data block in the buffer; and the echo delay is determined based on the target duration and the first counting value. In this way, in the process of detecting the echo delay, the quantity of consumed computing resources may be reduced, especially in a case that a long delay is detected, so that the efficiency of detecting the echo delay may be increased.

It should be appreciated that the various forms of processes shown above may be used to reorder, add, or delete steps. For example, the steps recorded in the present disclosure may be performed in parallel, sequentially, or in a different order, as long as a desired result of the technical solutions disclosed in the present disclosure can be achieved. This is not limited herein.

The foregoing specific implementations do not constitute a limitation on the protection scope of the present disclosure. Those skilled in the art should understand that various modifications, combinations, sub-combinations, and substitutions may be made according to design requirements and other factors. Any modifications, equivalent substitutions, improvements, or the like made within the spirit and principles of the present disclosure shall be included in the protection scope of the present disclosure.

What is claimed is:

1. A method for detecting an echo delay, applied to a first electronic device provided with a counter, and comprising:

in a case that the first electronic device plays an audio and the counter is in an on state, acquiring an $N^{th}$ recording data block received after the counter is turned on, wherein the $N^{th}$ recording data block is a currently received recording data block, and N is an integer greater than 1;

performing matching between the $N^{th}$ recording data block and a reference data block that is in a buffer, wherein both the recording data block and the reference data block are data blocks with target duration, and the buffer is configured to, after the counter is turned on, buffer an audio data block played by the first electronic device;

in a case that the $N^{th}$ recording data block matches the reference data block in the buffer, acquiring a first counting value of the counter, wherein the counter performs counting in a case that the recording data block does not match the reference data block in the buffer; and determining the echo delay based on the target duration and the first counting value.

2. The method according to claim 1, wherein the acquiring a first counting value of the counter comprises:
acquiring a target quantity of matching times, wherein the target quantity of matching times comprises a quantity of times that the first electronic device continuously determines that the currently received recording data block matches the reference data block in the buffer; and
acquiring the first counting value of the counter in a case that the target quantity of matching times meets a preset condition.

3. The method according to claim 2, wherein the acquiring the first counting value of the counter in a case that the target quantity of matching times meets the preset condition comprises:
in a case that the target quantity of matching times is greater than or equal to a preset quantity of times, acquiring the first counting value of the counter, wherein a value of the preset quantity of times is an integer greater than 1.

4. The method according to claim 2, wherein:
a maximum storage capacity of the buffer is equal to sizes of M reference data blocks, and M is an integer greater than 1; and
acquiring the first counting value of the counter in a case that the target quantity of matching times meets a preset condition comprises, in a case that the target quantity of matching times is M, acquiring the first counting value of the counter.

5. The method according to claim 1, wherein performing the matching between the $N^{th}$ recording data block and the reference data block that is in the buffer comprises:
in a case that an $(N-1)^{th}$ recording data block does not match the reference data block in the buffer, performing matching between the $N^{th}$ recording data block and a first recording data block in the buffer.

6. The method according to claim 1, wherein subsequent to the performing matching between the $N^{th}$ recording data block and the reference data block that is in the buffer, the method further comprises:
in a case that the $N^{th}$ recording data block does not match the reference data block in the buffer, acquiring a second counting value of the counter; and
in a case that a delay determined based on the second counting value and the target duration is greater than or equal to a preset delay threshold, clearing the buffer and resetting the counter.

7. The method according to claim 1, wherein:
the first electronic device is configured to transmit the played audio to a second electronic device, and the second electronic device is configured to output the audio; and
the $N^{th}$ recording data block is a recording data block recorded in a case that the second electronic device outputs the audio.

8. An apparatus for detecting an echo delay, applied to a first electronic device provided with a counter, and comprising:
a memory;
a processor;
and a computer program stored in the memory and executable by the processor, the processor is configured to execute the computer program to,
in a case that the first electronic device plays an audio and the counter is in an on state, acquire an $N^{th}$ recording data block received after the counter is turned on, wherein the $N^{th}$ recording data block is a currently received recording data block, and N is an integer greater than 1,
perform matching between the $N^{th}$ recording data block and a reference data block that is in a buffer, wherein both the recording data block and the reference data block are data blocks with target duration, and the buffer is configured to: after the counter is turned on, buffer an audio data block played by the first electronic device,
in a case that the $N^{th}$ recording data block matches the reference data block in the buffer, acquire a first counting value of the counter, wherein the counter performs counting in a case that the recording data block does not match the reference data block in the buffer, and
determine the echo delay based on the target duration and the first counting value.

9. The apparatus according to claim 8, wherein the processor is further configured to execute the computer program to:
acquire a target quantity of matching times, wherein the target quantity of matching times comprises a quantity of times that the first electronic device continuously determines that the currently received recording data block matches the reference data block in the buffer; and
acquire the first counting value of the counter in a case that the target quantity of matching times meets a preset condition.

10. The apparatus according to claim 9, wherein the processor is further configured to execute the computer program to:
in a case that the target quantity of matching times is greater than or equal to a preset quantity of times, acquire the first counting value of the counter, wherein a value of the preset quantity of times is an integer greater than 1.

11. The apparatus according to claim 9, wherein:
a maximum storage capacity of the buffer is equal to sizes of M reference data blocks, and M is an integer greater than 1; and
the processor is further configured to execute the computer program to, in a case that the target quantity of matching times is M, acquire the first counting value of the counter.

12. The apparatus according to claim 8, wherein the processor is further configured to execute the computer program to:
in a case that an $(N-1)^{th}$ recording data block does not match the reference data block in the buffer, perform matching between the $N^{th}$ recording data block and a first recording data block in the buffer.

13. The apparatus according to claim 8, wherein the processor is further configured to execute the computer program to:
in a case that the $N^{th}$ recording data block does not match the reference data block in the buffer, acquire a second counting value of the counter; and
in a case that a delay determined based on the second counting value and the target duration is greater than or equal to a preset delay threshold, clear the buffer and reset the counter.

14. The apparatus according to claim 8, wherein:
the first electronic device is configured to transmit the played audio to a second electronic device;

the second electronic device is configured to output the audio; and the $N^{th}$ recording data block is a recording data block recorded in a case that the second electronic device outputs the audio.

15. A non-transitory computer-readable storage medium storing a computer instruction, wherein the computer instruction is used for causing a computer to:

in a case that the first electronic device plays an audio and the counter is in an on state, acquire an $N^{th}$ recording data block received after the counter is turned on, wherein the $N^{th}$ recording data block is a currently received recording data block, and N is an integer greater than 1;

perform matching between the $N^{th}$ recording data block and a reference data block that is in a buffer, wherein both the recording data block and the reference data block are data blocks with target duration, and the buffer is configured to: after the counter is turned on, buffer an audio data block played by the first electronic device;

in a case that the $N^{th}$ recording data block matches the reference data block in the buffer, acquire a first counting value of the counter, wherein the counter performs counting in a case that the recording data block does not match the reference data block in the buffer; and determine the echo delay based on the target duration and the first counting value.

16. The non-transitory computer-readable storage medium according to claim 15, wherein the computer instruction is used for causing the computer to:

acquire a target quantity of matching times, wherein the target quantity of matching times comprises a quantity of times that the first electronic device continuously determines that the currently received recording data block matches the reference data block in the buffer; and acquire the first counting value of the counter in a case that the target quantity of matching times meets a preset condition.

17. The non-transitory computer-readable storage medium according to claim 16, wherein the computer instruction is used for causing the computer to:

in a case that the target quantity of matching times is greater than or equal to a preset quantity of times, acquire the first counting value of the counter, wherein a value of the preset quantity of times is an integer greater than 1.

18. The non-transitory computer-readable storage medium according to claim 16, wherein:

a maximum storage capacity of the buffer is equal to sizes of M reference data blocks, and M is an integer greater than 1, and the computer instruction is used for causing the computer to, in a case that the target quantity of matching times is M, acquire the first counting value of the counter.

19. The non-transitory computer-readable storage medium according to claim 15, wherein the computer instruction is used for causing the computer to:

in a case that an $(N-1)^{th}$ recording data block does not match the reference data block in the buffer, perform matching between the $N^{th}$ recording data block and a first recording data block in the buffer.

20. The non-transitory computer-readable storage medium according to claim 15, wherein the computer instruction is used for causing the computer to:

in a case that the $N^{th}$ recording data block does not match the reference data block in the buffer, acquire a second counting value of the counter; and in a case that a delay determined based on the second counting value and the target duration is greater than or equal to a preset delay threshold, clear the buffer and reset the counter.

* * * * *